Oct. 30, 1951   J. J. ISRAEL   2,572,862
PNEUMATIC CONVEYING SYSTEM AND METHOD
Filed Feb. 13, 1947   8 Sheets-Sheet 2

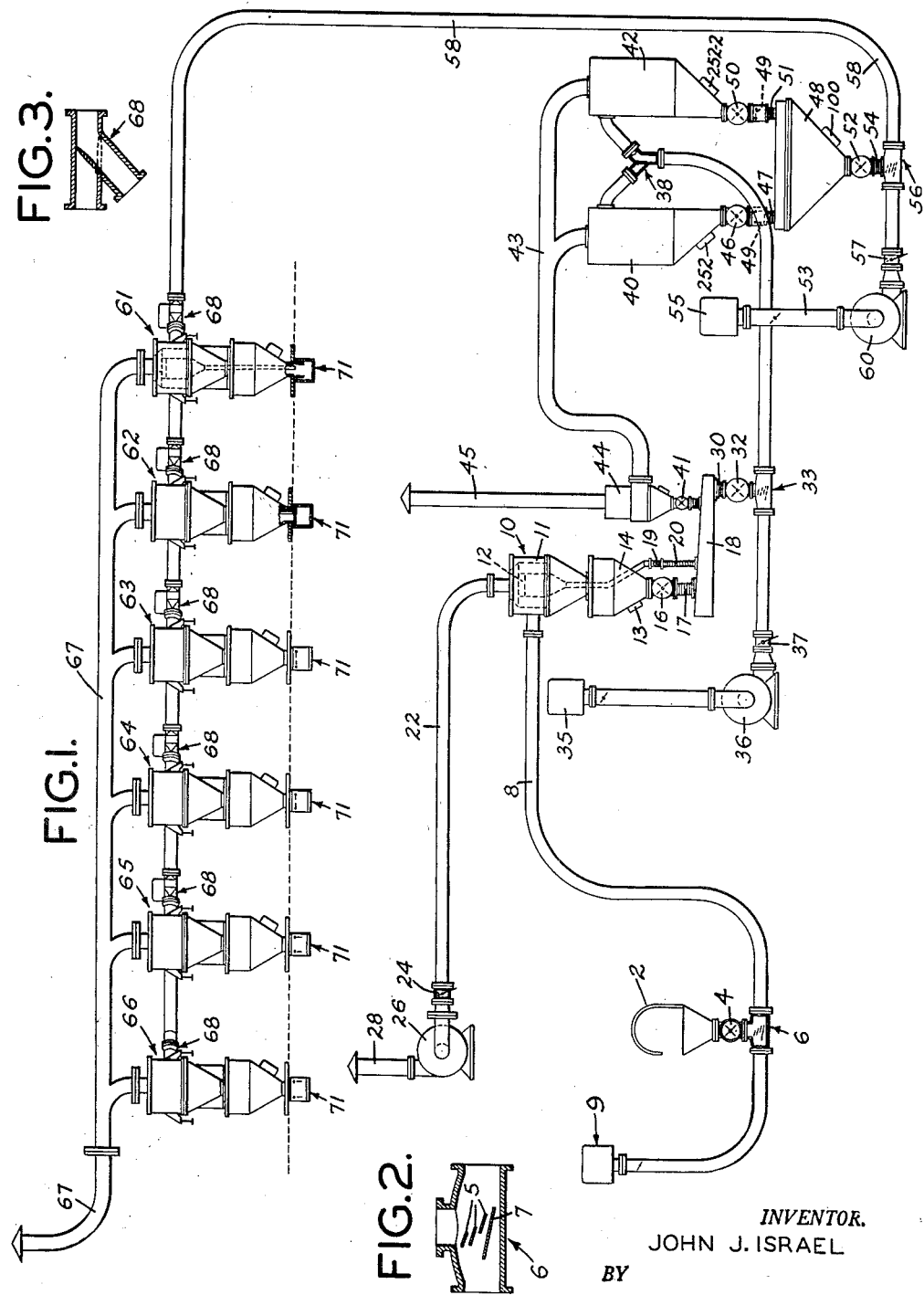

INVENTOR
John J. Israel, deceased,
by Ray S. Israel, administratrix
BY Curtis, Morris & Safford
ATTORNEYS Oct. 30, 1951          J. J. ISRAEL                2,572,862
              PNEUMATIC CONVEYING SYSTEM AND METHOD
Filed Feb. 13, 1947                          8 Sheets-Sheet 3

INVENTOR
John J. Israel, deceased,
by Ray S. Israel, administratrix

INVENTOR
John J. Israel, deceased,
by Ray S. Israel, administratrix
BY Curtis, Morris & Safford
ATTORNEYS

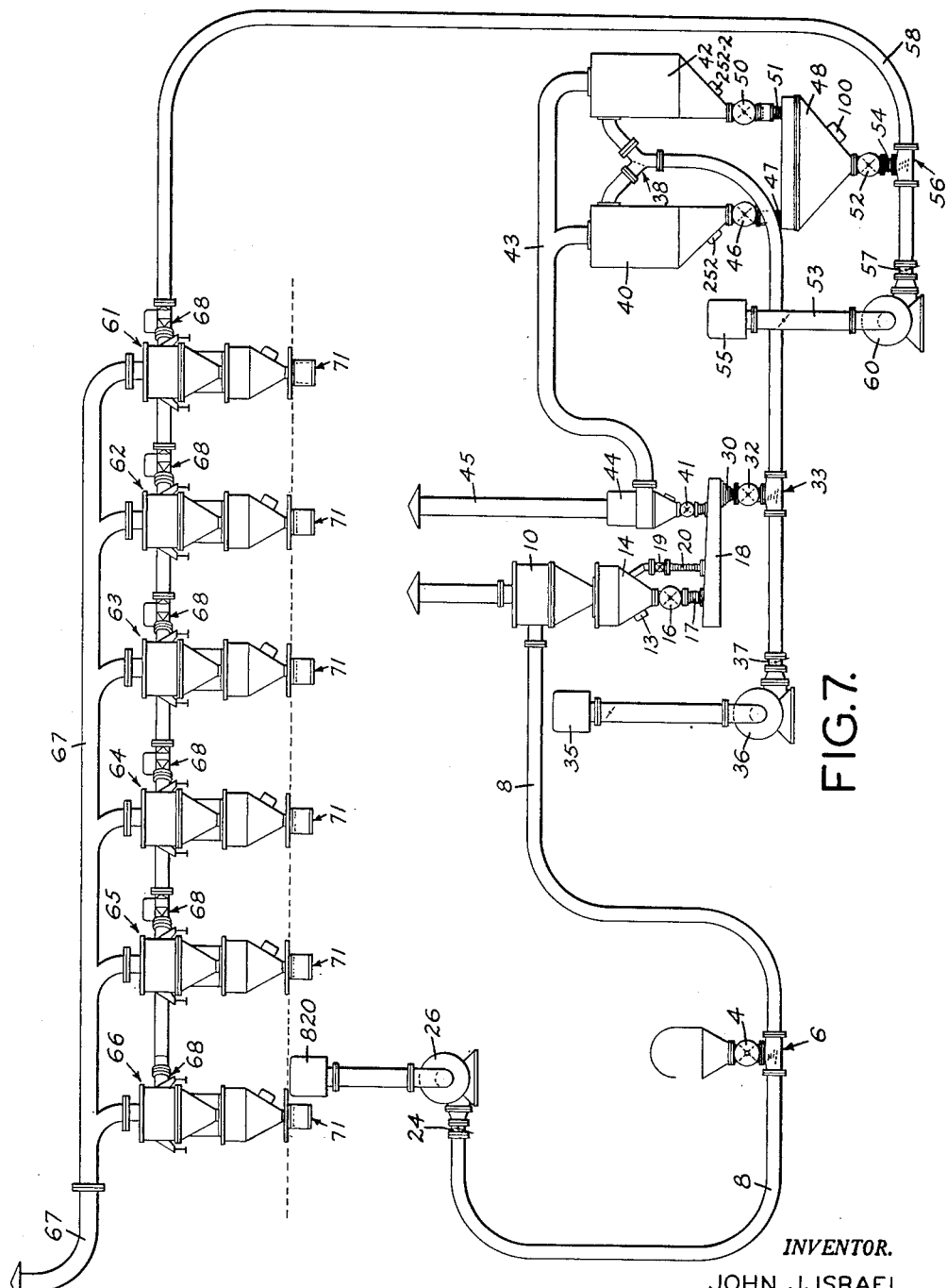

UNITED STATES PATENT OFFICE 2,572,862

PNEUMATIC CONVEYING SYSTEM AND METHOD

John J. Israel, Merrick, N. Y.; Ray S. Israel, administratrix of said John J. Israel, deceased, assignor to Ray S. Israel, Merrick, Long Island, N. Y.

Application February 13, 1947, Serial No. 728,222

28 Claims. (Cl. 302—28)

This invention relates to the storing and handling of bulk products, and more in particular to a system for storing, conveying, measuring and processing flour or the like.

An object of this invention is to provide a fully automatic system for handling flour or the like in a storage or processing plant such, for example, as in a bakery. A further object is to provide a system for conveying, weighing and otherwise processing flour or the like in an efficient manner which avoids certain of the disadvantages of the prior systems. A further object is to provide a system of the above character wherein flour or the like may be stored and handled in such a manner as to insure that it will remain unadulterated; thus, for example, so as to avoid the problems of insect infestation. A further object is to provide such a system wherein wastage of the product is at a minimum. These and other objects will be in part obvious and in part pointed out below.

In the drawings:

Figure 1 is a schematic showing of a system for handling and processing flour in a large bakery wherein there is provision for unloading the flour into storage bins and also provision for sifting, weighing and conveying the flour to various dough-mixing stations;

Figures 2 and 3 are enlarged sectional views of structural elements appearing in Figure 1;

Figures 4A, 4B:
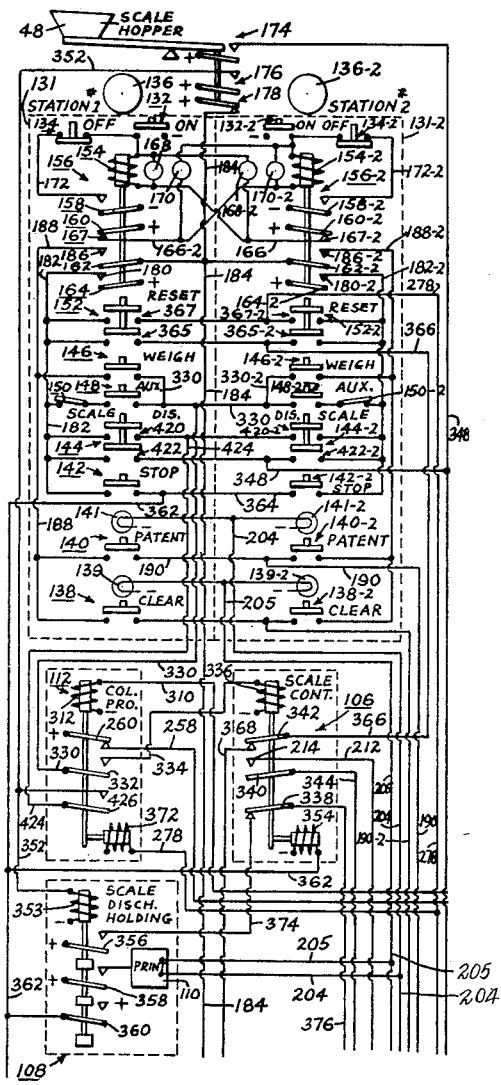
Figures 4a, 4b, 4c, 4d, 4e are a simplified schematic wiring diagram of the system of Figure 1, with certain of the duplicate equipment omitted; and, Figures 5, 6 and 7 are views similar to Figure 1 showing other embodiments of the invention.

The illustrative embodiment of the invention is a system for handling the flour which is used in a large bakery. The flour may be received by the system from bags or in bulk from railway cars or trucks. Two or more types of flour may be used and these are stored separately or in blended mixtures in bins, but yet a single conveyor system is used for the different types of flour. The flour is received and stored on a lower floor of the building and automatic dough-mixing equipment is located on an upper floor of the building. The flour may be blended, sifted, stored and weighed on the lower floor, and weighed batches of flour are conveyed as needed to the dough-mixing equipment. Illustratively, there are six dough-mixing stations on the upper floor representing six sets of dough-mixing equipment of known construction. With this system any quantity of the selected type of flour is weighed out and conveyed to any selected dough-mixing station and the process is carried on rapidly and efficiently. One or two operators may control the entire system and if there are two operators, the use of the system by one automatically locks out the control switches for the other. The operation of the conveyor system is completely automatic after being once started, and it is self-cleaning so that it is left in condition for immediate re-use.

The present invention has the outstanding further advantage that it facilitates the handling of the problem of insect infestation. In bakeries, flour mills and storage warehouses for cereals and cereal products the problem of insect infestation has been a very serious one. In fact, this problem is present throughout the cereal industry, that is, from the producer of the grain to the ultimate consumer; the value of the various grains and cereal products thus lost amounts to millions of dollars every year. This problem has arisen mainly due to two factors which are, the ever-present sources of insect life, and the ever-present breeding places where insect life is permitted to propagate freely under ideal conditions. That is, cereals are invariably infested with one or more types of insect life and the various plants, including the mills, become infested as the cereal and cereal products enter the mills. With the mills thus infested, it is difficult to prevent the infestation of the various outgoing products such as flour. These products are stored in warehouses and in processing plants where they are to be used and during storage such infestation as is present propagates very rapidly.

With the handling equipment for flour and like products which has been available in the past there are numerous pockets and recesses in which the products accumulate with the result that infestation is given an ideal oportunity to propagate. For example, there are "dead spaces" in screw and bucket conveyors where the product accumulates and remains stationary during use of the equipment, and these "dead spaces" are generally centers of insect infestation. Furthermore, during handling, these products escape in the form of dust and float through the air and settle upon all horizontal surfaces in the plant; when an appreciable layer of dust thus accumulates, the dust provides an ideal place for insect propagation. In many plants it is a routine practice to clean and fumigate at regular intervals, but this requires that the plant be closed for a period of time and the use of fumigants is objectionable. During this periodic cleaning the "dead spaces" are cleaned out, but normally the products which are thus removed are infested so that they must be discarded and this represents a substantial loss.

In addition to the infestation problem, often there is a substantial loss due to dust which escapes during handling because this too becomes contaminated and must be discarded. Furthermore, in plants which use two or more different products, such as the different types of flour which are used in a bakery, the products which collect in the "dead spaces" should be cleaned out when a different type of product is to be handled in the conveying system; otherwise, the flour handled subsequently becomes adulterated by the prior accumulations.

In accordance with the present invention the product is handled in such a manner as to avoid the escape of dust and the entire system is free of "dead spaces." Furthermore, it has been found that insect infestation does not propagate and, in fact, it may be destroyed during the conveying operations. The product is conveyed in a stream of air through conduits which have streamlined interiors so that there are no "dead spaces," and the product is separated from the air in such a manner as to avoid the discharging of dust with the air. Thus, the entire plant is free of product accumulations, and such infestation as does enter the plant can be destroyed and there is still no great infestation problem.

Avoiding the escape of dust into the air is also very important from the standpoint that it eliminates the "explosion hazard." That is, with the prior flour-handling systems there was sufficient flour dust in the air throughout the plant to make the danger of a dust explosion a real problem. With flour-conveying systems built in accordance with the present invention the flour is thoroughly removed from the air streams at the collectors and dust does not escape into the plant; thus, the atmosphere in the plant is kept free of flour dust.

In the illustrative embodiment of the invention a flour-handling system for a bakery is provided wherein each of two or more kinds of flour is unloaded from bags, barrels, freight cars or trucks and is stored in its bin. Before storage the flour is sifted and if desirable it can be conditioned, for example, by cooling or heating it, or by "tempering" it by adding moisture, or by removing moisture. That is, the air used for conveying the flour is given the necessary temperature and humidity to properly condition or temper the flour and the intimate contact between each particle of flour and the air insures that the conditioning will be thorough. Furthermore, all of the moisture which is added to the flour is thoroughly absorbed and an "equilibrium condition" is reached wherein there is no free moisture in the air at the time the stream reaches the collectors. Likewise, when moisture is removed from the flour the stream reaches the collector only after a similar "equilibrium condition" has been reached. Therefore, whether moisture is removed or added, there are no globules of water knocked out of the stream due to cyclonic action in the collectors. With the present system, the flour may have additional materials added to it, such, for example, as "fortifying materials"; and these are thoroughly mixed with the flour. The system also provides for the withdrawing of flour selectively from the various bins and for weighing the flour into batches as desired.

These batches are conveyed selectively to the six different dough-mixing stations on an upper floor of the bakery. Illustratively, adjacent the point where flour is received by the system there is a flour-receiving control station at which is located the control equipment for delivering the flour to the bins and for performing the various desired functions on the system. Adjacent the dough-mixing stations are two batch-selecting control stations each of which controls the delivery of flour to three of the six dough-mixing stations. At these control stations the weight and type of flour as well as the destination (i. e., the desired dough-mixing station) may be selected for each batch of flour, and the entire weighing and conveying operation is controlled. After this selection of the type and weight of flour and the destination of the batch, the operation will be carried on automatically as desired.

As indicated above, the flour is conveyed through pipes or conduits to the various destinations by fast moving streams of air. There is a separating unit or collector at each destination, that is, at the sifter and at each bin and dough-mixing station. As a flour-laden stream of air is directed to one of these collectors the flour is separated from the air and is discharged at the bottom of the collector; the stream of air is passed either to exhaust or back to the inlet for the conduit. These collectors may have two stages, a primary stage which removes the major portion of the flour and a secondary stage which removes the remainder of the flour. With these collectors, the flour-laden stream of air is delivered to the first stage where the greater portion of the flour is extracted; the stream then flows at a rapid rate to the second stage where the remainder of the flour is removed from the air. In passing from the primary stage to the secondary stage, the stream of air flows at a sufficiently rapid rate to hold the flour in suspension. Otherwise small amounts of the flour drop out and may accumulate, thus forming a zone for the propagation of insect life.

As indicated above, a reduction in the insect infestation problem is brought about by the avoidance of flour accumulations where insect life may propagate. In addition to this factor, it has been found that at least certain types of insect life are destroyed in the conveying system. It should be noted that the rate of flow is very rapid in the conduits and in the collectors, and the infestation destruction may result from this high speed or from life-destroying impacts against the conduit and collector walls.

Referring particularly to Figure 1 of the drawings, the apparatus for receiving flour is represented at the left by a flour-receiving hopper 2 and as flour is received it is dumped into this hopper. At the bottom of this hopper is a rotary feed valve 4, the rotor of which is turned at a constant speed so as to carry measured quantities of the flour from the hopper around to the bottom of the valve where it is deposited into an aerator 6 connected into conduit 8.

As best shown in Figure 2, aerator 6 has four transverse vanes positioned directly beneath valve 4 so that the flour dropping from the valve cascades to the right down the vanes. There are three narrow vanes 5 and a bottom wide vane 7, and a steady stream of air flows from left to right through the aerator so that the flour is picked up and entrained in the stream of air. The air enters conduit 8 at the left through an air filter 9 and it passes with the flour entrained therein to a two-stage collector 10 of the cyclone separator type. Collector 10 has an outer primary stage collector 11 and a concentrically positioned inner secondary stage collector 12.

Flour from the primary stage passes through a hopper 14 having a vibrator 13 to a valve 16 which delivers the flour through a flexible conduit coupling 17 to a sifter 18. Flour from the secondary stage passes through a similar hopper, a valve 19 and a flexible conduit coupling 20 to sifter 18. The flour-free air is drawn from the top of the collector through a conduit 22, having at the left an adjustable damper or blast gate 24, by a fan 26 which exhausts the air to atmosphere through a conduit 28.

Conduit 8 has a smooth, streamlined interior so that there are no crevices or pockets where flour may collect. Fan 26 is located at the exhaust with the result that the system operates as a suction system; thus, flour is picked up by the aerator and is carried to the collector where it is separated from the air, and this conveying operation is carried on in an efficient and dependable manner. The rotor of valve 4 is turned at a controlled constant speed with the result that flour is supplied to the stream of air at the maximum rate consistent with efficient operation.

Within the sifter foreign materials are separated from the flour and the clean flour passes through a flexible conduit 30 and a rotary valve 32 to an aerator 33 where it is entrained in a stream of air carried by a conduit 34, the arrangement being similar to the arrangement for entraining flour from hopper 2 into the stream of air in conduit 8. However, the air passes through conduit 34 due to pressure rather than suction, there being at the left a fan 36 which draws air in through an air filter 35 and delivers air to the conduit at a pressure which is controlled by a blast gate 37.

Conduit 34 extends to the right where a motorized selector valve 38 directs the flour-laden stream of air to the left to a bin 40 or to the right to a bin 42, the destination of the flour depending upon the position of the valve vane. Bins 40 and 42 are cylindrical and the flour-laden stream of air enters tangentially so that the major portion of the flour is separated from the air in the selected bin by cyclonic action. The air is discharged from the top centers of the bins through a conduit 43 which extends to the left to a cyclone separator type of collector 44, where the remainder of the flour is separated from the air and the flour-free air is discharged to atmosphere through a conduit 45. The flour is discharged through the hopper bottom of collector 44 by a valve 41, and a flexible conduit coupling to the sifter, the arrangement being similar to that for discharging flour from collector 10.

Under some circumstances the stream of flour-laden air from conduit 34 may be passed directly to a collector 44 so that the entire separating action is in the collector and the flour from the collector is discharged into the selected bin 40 or 42. However, by discharging the stream of flour-laden air into the top of the bin, there is a sufficient separating action to cause the major portion of the flour to be dropped out into the bin. Therefore, the air which enters separator 44 contains only a relatively small percentage of the total amount of flour which the stream of air in conduit 34 carries and separator 44 performs its separating operation more efficiently with less restriction in the flow of air.

The bottom of bin 40 is provided with a rotary valve 46 which discharges through a flexible coupling 47 into a scale hopper 48. Similarly, at the bottom of bin 42 is a rotary valve 50 which discharges through a flexible coupling 51 into the scale hopper. Thus, by selectively rotating the rotors of valves 46 and 50, flour from either of the two bins can be delivered to the scale hopper and a weighed quantity or batch of flour from either of the bins can thus be obtained. Beneath each of valves 46 and 50 is a double-vane cut-off valve 49 which is closed to stop the delivery of flour to the scale hopper immediately upon the quantity of flour in the scale hopper reaching the desired weight. Control means is provided to select the type and weight of each batch of flour and the weighing operation is carried on automatically.

At the bottom of the scale hopper is a rotary valve 52 which delivers the flour at the end of the weighing operation through a flexible coupling 54 to an aerator 56 which is similar to aerator 6. Aerator 56 is positioned in a conduit 58 through which a stream of air is directed from the left by a fan 60. Fan 60 draws in clean air through a conduit 53 and a filter 55 and the pressure in conduit 58 is controlled by a blast gate 57.

The flour-laden stream of air passes to the right through conduit 58 and thence up to the dough-mixing stations on an upper floor of the building. On this upper floor conduit 58 passes adjacent the six dough-mixing stations at each of which is a collector, numbered 61 to 66, inclusive, which are similar to collector 10. Each of these collectors is adapted to receive the flour-laden stream of air from conduit 58 and to separate the flour therefrom. The flour is delivered from the hopper bottom of each of the collectors to its dough-mixing machine by opening a double-vane flap valve 71 with the arrangement being such that the left-hand vane of the valve seals off the bottom of the primary stage of its collector and the right-hand vane seals off the bottom of the secondary stage. The flour-free air is discharged to atmosphere through a conduit 67 to which all of the collectors are directly connected. The left-hand collector 66 is directly connected to conduit 58 and each of the other collectors may be connected to this conduit by its two-position flap valve 68, the structure of which is shown best in Figure 3. The vanes of these valves are normally in the broken-line position of Figure 3 flush with the side of conduit 58, and when the vane of a particular valve is moved to the full line position of Figure 3 the flour-laden stream of air is diverted from conduit 58 to the adjacent collector. Thus, during operation, if the flour is to be delivered to one of the collectors 61 to 65, inclusive, the appropriate valve is swung to the broken line position, but if the flour is to be delivered to collector 66 the valves all remain in their normal positions. Conduit 58 terminates in collector 66 but the flour-laden stream of air may be diverted from the conduit before it reaches this collector. In this way the flour is never discharged through conduit 67 because the stream is received by collector 66 if it is not diverted by one of valves 68.

As indicated above, the present system provides for the weighing out of pre-determined quantities or batches of flour from either bin 40 or bin 42, and each weighed quantity is delivered to any selected one of the dough-mixing stations. The electrical circuit for this flour-weighing and conveying mechanism is represented schematically and in somewhat simplified form in Figure 4a. Illustratively, there are two control stations positioned adjacent the dough-mixing stations; station #1 controls the delivery of flour to collectors 61, 62 and 63, and station #2 controls the delivery of flour to collectors 64, 65 and 66.

Referring to Figure 4b, the scale hopper 48 is represented in schematic form at the top, and these two control stations are represented beneath the hopper.

Figure 4C:
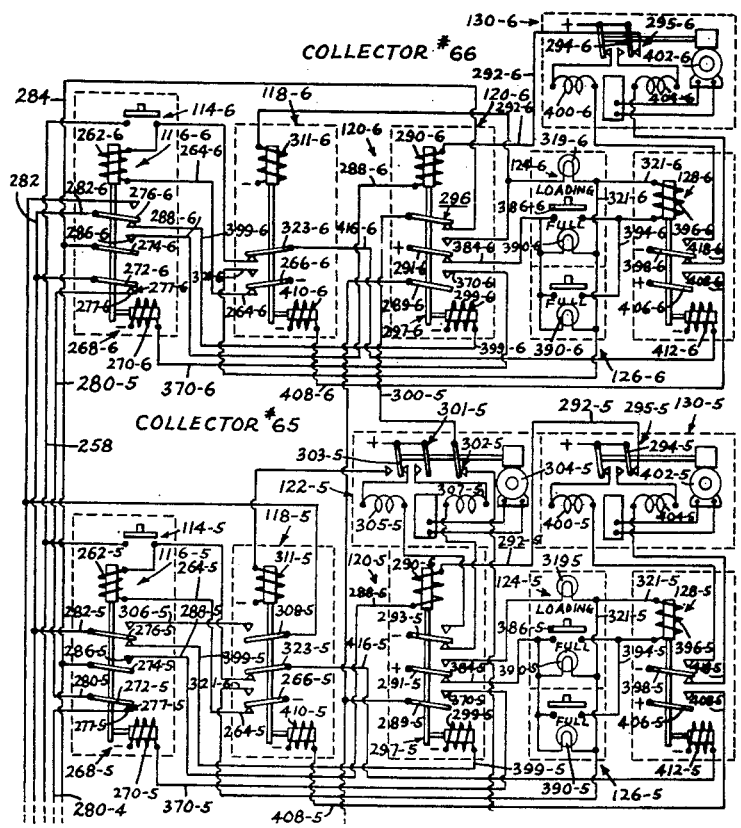
Figure 4D:
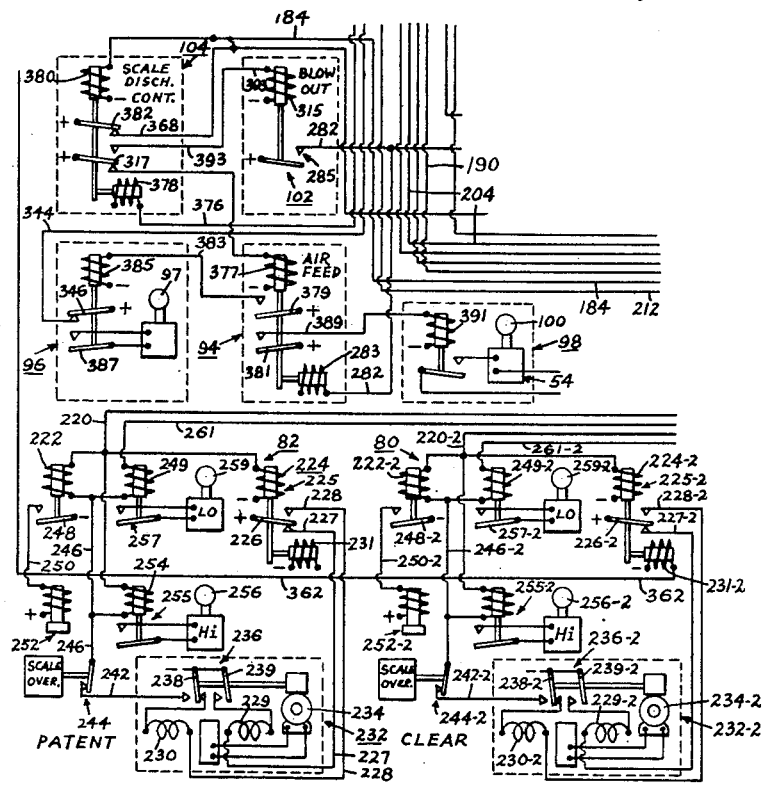
Figure 4E:
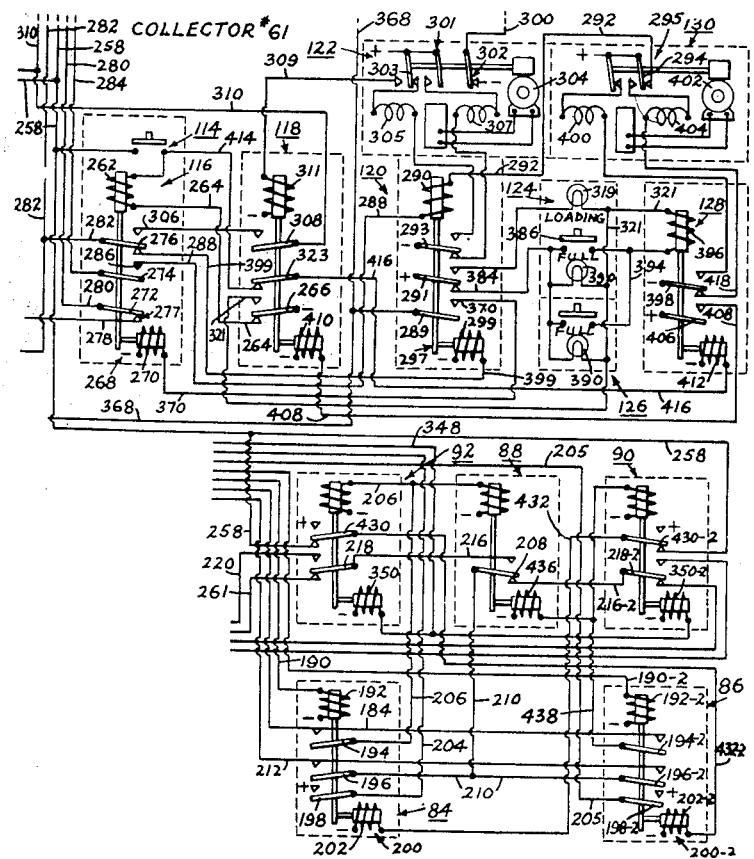

At each of these control stations is a scale control head by means of which the scale may be set for any selected weight, and there is an indication at the scale head of the weight setting as well as a continuous indication of the quantity of material which is in the scale hopper. During the weighing operation the movement of the scale hopper operates control switches with the result that the rate of feed to the hopper is reduced when the amount of flour in the hopper approaches the desired weight, and then the feed is stopped when the desired weight has been reached. At each of the control stations there are switches which are operated to control the selection of the type of flour and the weighing and conveying operations so that each quantity or batch of flour is delivered to the selected collector at a dough-mixing station. At each of the dough-mixing stations is a set of mechanism and these sets of mechanism are identical at the various stations except that there is no valve 68 and its mechanism at collector 66. In Figures 4c and 4e the control circuits and associated mechanism for stations 61, 65 and 66 are represented and the corresponding mechanism for the other three stations is omitted. The various duplicate elements of the different stations are given the same numerals except that suffixes are added identifying the particular stations; that is, the elements for collector 61 have no suffixes, but the suffixes 5 and 6 are added to the respective numerals identifying the identical elements for collectors 65 and 66.

The mechanism for performing the various weighing and conveying operations for the system are represented in the lower portion of the figure and these are boxed in broken lines and are referred to herein by descriptive names for ready identification. In the lower portion of the figure, the mechanism for feeding flour from the clear flour bin 42 is represented at 80, and at the left of this the corresponding mechanism for feeding patent flour from bin 40 is represented at 82. There are also the following: the patent flour selecting relay mechanism 84; the clear flour selecting relay mechanism 86; a bin protecting relay assembly 88 which prevents the delivery of flour from either of bins 40 or 42 after delivery has been started from the other bin; a patent flour control relay 92 which controls the feed motor which rotates valve 46 to feed flour from bin 40; a similar clear flour control relay 90 which controls the feed motor which rotates valve 52 to feed flour from bin 42, at the right, an air feed relay 94 which controls a valve motor relay 96, which, in turn, controls a motor 97. Motor 97 rotates valve 52 thus to deliver flour from the scale hopper 48 to the stream of air in conduit 58. The air feed relay 94 also controls the energization of a hopper discharge relay 98 thus to operate the scale hopper-discharge valve 52 so as to cause the flour to flow from the hopper and also to energize a vibrator 100 positioned on the side of the scale hopper which vibrates the hopper wall when flour is being delivered from the hopper. This vibrator insures that the flour will flow in an even stream through valve 52 so that it is delivered to the air stream in an efficient manner.

Directly above relay 94 is a blowout relay 102 which holds the air feed relay 94 energized for a period of time after the scale hopper is empty and in this way the scale mechanism and the conduit are blown free of flour. At the left of relay 102 is a scale discharge control relay 104 which exerts supervisory control over the discharging of flour from the scale hopper. This relay is in turn controlled by a scale control relay 106. Under some circumstances it is desirable to delay the discharging of flour from the scale hopper for an extended period of time after the weighing operation has been completed. This operation is obtained by a scale discharge holding relay 108 which is energized at the time the scale hopper has received the selected quantity of flour. The energization of this relay operates the scale printing mechanism 110 which records the weight of each quantity or batch of flour weighed out; relay 108 remains energized until it is desirable to convey the batch of flour to a collector at which time this relay is de-energized.

With the present system each collector has a collector selecting switch positioned at its control station and when a batch of flour is being delivered to one collector, the other collector selecting switches are rendered inoperative. In this way no harm results from the inadvertent closing of a second collector selector switch while the conveying operation is in progress. This function of the system is performed by a collector protective relay 112 which is energized when each weighing operation is started and which remains energized during normal operation until the batch of flour has been weighed out and delivered to the selected collector.

Referring now to Figure 4e, at the dough-mixing station represented by collector 61 is a collector selecting switch 114 which controls a collector setting relay 116. Adjacent this relay is a valve protecting relay 118 and at the right is the main collector relay 120 which controls the valve operating mechanism 122 for valve 68. A pair of discharge control panels are represented at 124 and 126 at each of which are control switches and indicating lights; and at the right is a discharge control relay 128 which controls the double-vane discharge valve mechanism 130 for discharging flour from the hopper at the bottom of the collector. The stations for collectors 65 and 66 have these same elements which are designated correspondingly by the suffix —5 and —6, except that there is no valve 68 at collector 66 and therefore there is no mechanism corresponding to valve operating mechanism 122.

Referring now to left-hand side of the figure where the control mechanism at the two control stations is represented, the two stations are provided with an identical set of elements with the elements for station #1 having no suffix and the corresponding elements for station #2 being designated with the corresponding numbers with the suffix —2. In the present discussion, the elements of station #1 will be explained in detail with the understanding that the elements of station #2 are identical. Station #1 is provided with a panel 131 upon which is mounted the collector selecting switches 114 (referred to above) for the stations of the three collectors 61, 62 and 63. There is also a normally open "On" push button switch 132 and a normally closed "Off" push button switch 134. The control station is also provided with a remote control scale head 136 which includes mechanism for setting the scale for the desired weight and also for indicating the weight of the material in the hopper. Near the bottom of panel 131 are two flour-selecting push button switches 138 and 140, the former of which is closed to select clear flour and the latter of which is closed to select patent flour. Adjacent switch 138 is an indicating light 139 which is lighted upon the closing of this switch to indicate that clear flour has been selected, and adjacent switch 140 is a similar indicating light 141 which indicates when patent flour has been selected.

Station #1 also includes the following: a "Stop" switch 142 which is closed to stop the weighing operation if such is desirable while these operations are in progress; a scale discharge switch 144 which is closed to initiate the delivery of flour from the hopper to conduit 58 after the scale stop switch has been operated and it is desired to deliver the flour in the hopper to the collectors; a main weigh control switch 146 which is operated to start the feeding of flour to the scale hopper thus to carry out the weighing operation; a reset switch 152 which is closed to clear the circuits in the event that the operator desires to change a previously made selection of a collector thus to deliver a particular batch of flour to a collector other than one previously selected; and, an auxiliary weigh switch 148 which is closed to restart the weighing operation after it has been stopped for one reason or another, such, for example, by the closing of switch 142. Switch 148 has in series with it a normally-closed manual switch 150 which may be opened to render switch 148 inoperative.

As indicated above, station #1 is provided with a normally open "On" push button switch 132 and a normally closed "Off" push button switch 134. These switches control a relay 156 which has a solenoid 154 and four armatures 158, 160, 162 and 164. This relay is held energized whenever the system is being operated from station #1 to carry on a weighing and conveying operation for one of its collectors 61, 62 and 63. Station #2 is provided with a similar relay 156—2 which is energized whenever the system is being operated from station #2 and which has elements corresponding to those of relay 156 and designated with the suffix —2. These two relays are inter-connected so that when both of the relays are de-energized the closing of either one of the "On" switches (132 or 132—2) completes a circuit to energize the associated relay; except that when either one of the relays is already energized, the closing of the "On" switch for the other relay has no effect. Each of the "On" switches is connected at one side to the negative side of the power source and at the other side to its solenoid (154 or 154—2). The other side of solenoid 154 is connected through line 166 to a contact 167—2 which is engaged by armature 160—2 of relay 156—2 when this relay is de-energized. The energizing circuit for solenoid 154—2 is similar and includes a line 166—2 connecting the solenoid to a contact 167 which is engaged by armature 160 when relay 156 is de-energized. Armatures 160 and 160—2 are connected to the positive side of the power source and therefore when both stations are idle, the closing of either of the "On" switches energizes the corresponding relay and this lifts the associated armature so as to open the circuit to the solenoid of the other relay.

Solenoid 154 has in parallel with it a pair of indicating lights 168 and 168—2 which are positioned respectively on panels 131 and 131—2 to be lighted when relay 156 is energized; thus to indicate that station #1 is in use. Similarly, solenoid 154—2 has in parallel with it a pair of indicating lights 170 and 170—2 which are positioned respectively on the two panels and are lighted to indicate when station #2 is in use. Thus, at each station there is an indication as to which, if either, of the stations are being used.

Armature 158 is connected to the negative side of the power source and when in the raised position it engages a contact which is connected through a line 172 to the "Off" push button switch 134, the other side of which is connected to solenoid 154. Therefore, when switch 132 is closed momentarily so that armature 158 is raised by the energization of the relay, a lock-in circuit is completed to solenoid 154 through armature 158, line 172 and switch 134, and this circuit holds the solenoid energized even though switch 132 reopens. Then, the relay may be readily de-energized by pushing push button switch 134 so as to open the switch and break the lock-in circuit. With this arrangement an operator at either of the stations may push his "On" push button switch 132 and thus energize his relay and hold the system for his exclusive use. When each weighing and conveying cycle has been completed armatures 158 and 158—2 are momentarily de-energized (by means not shown) so that the relays are both de-energized; therefore, the weighing and conveying system is again available at either of the control stations.

Scale hopper 48 has associated with it three switches 174, 176 and 178 which are represented in Figure 4b, immediately above panels 131 and 131—2 but which, in practice, are positioned at the scale hopper. Switch 178 remains closed when the scale hopper is in the zero weight position and it opens when the first quantity of material enters the hopper; as will be more fully explained below, this switch exerts control upon the system, for example, to prevent the inadvertent mixing of two different kinds of flour in the scale hopper. During the weighing operation, flour is delivered to the scale hopper at a rapid rate until the amount of flour in the hopper approaches the desired quantity, whereupon the rate of delivery of flour is reduced. Accordingly, switch 174 is closed at the time the scale hopper approaches the balanced condition and, as will be explained below, this reduces the rate of feed so that the scale hopper approaches its condition of balance at a very slow rate. When the exact quantity of flour has been delivered to the scale hopper, the cut-off switch 176 is closed and this stops the feeding operation.

Assume that the system is not in use and that the operator at control Station #1 wishes to weigh out and convey to collector 61 a batch of patent flour from hopper 40. As is explained more fully below, this is possible only when the hopper of collector 61 has been emptied and its hopper discharge valve is open. Normally, the first step is to push the "On" push button switch 132 so as to energize relay 156, but the operator also checks the setting of the scale as indicated on the scale control head 136 to make sure that the desired weight of flour will be weighed out. Armature 164 of relay 156 is connected to the positive side of the power source and the energization of the relay raises this armature into engagement with a contact 180 thus to energize a line 182 which is connected to one side of auxiliary weigh switch 148, stop switch 142, scale discharge switch 144 and reset switch 152 so that these switches are rendered effective. When the scale is at zero weight armature 162 of relay 156 is connected through a line 184 and switch 178 to the positive line and, therefore, the lifting of armature 162 connects the positive side of the battery through switch 178, line 184 and armature 162 to a contact 186 which is connected through a line 188 to one side of weigh switch 146 and the two flour-selecting switches 138 and 140, thus to render all of these switches also effective.

The operator then selects patent flour by closing push button switch 140, and this closes a circuit from the positive side of the power source to switch 140, as outlined above, and thence through a line 190 to the solenoid 192 of the patent flour selecting relay 84; the other side of solenoid 192 is connected to the negative line so that this relay is then energized. This raises the armatures 194, 196 and 198 of this relay, and the armatures are held in the raised position by an automatic latch mechanism 200 which has a latch-releasing solenoid 202. When armature 198 of relay 84 is in its raised position, it connects the positive line through a line 204 to signal lights 141 on the control panels 131 to indicate that patent flour selecting circuits have been set up.

As explained above, line 184 is connected to the positive line through the zero scale switch 178. In addition to the connections referred to above, this line extends to the contact of armature 194 of relay 84; and therefore, when this armature is raised, the positive line is connected through armature 194 and line 206 to one side of each of the solenoids of bin protecting relay 88 and clear flour control relay 92. The other side of each of these solenoids is connected to the negative line so that the setting up of the circuit referred to above energizes these relays. Relay 88 has its armature 208 connected through a line 210 to armature 196 of relay 84 and, therefore, the raising of armature 196 connects armature 208 through a line 212 to a contact 214 of the scale control relay 106. This is a portion of the flour feed control circuit to be referred to below. Armature 208 is raised by the energization of relay 88 so as to connect this circuit through a line 216 to armature 218 of relay 92 and, with relay 92 energized, the flour feed control circuit is extended through a line 220 to one side of each of solenoids 222, 254 and 224 of the flour feeding mechanism 42 of the patent flour bin 40. Solenoid 224 is the solenoid of a two-position valve control relay 225 which has an armature 226 connected to the positive line.

When armature 226 is in the position shown, it is connected through a line 227 to a valve-closing solenoid 229 of a valve control mechanism 232. This mechanism has a valve-opening solenoid 230, a valve operating motor 234 and a limit switch 236 which has two armatures 238 and 239. Motor 234 is operated to open and close the valve at the bottom of bin 40 and as the valve swings from and to the closed position these armatures are swung from and to the position shown. Thus, the armatures are in the right-hand position shown when the valve is closed with the result that armature 238 completes a circuit from the negative line to one side of solenoid 230. The other side of this solenoid is connected through line 228 to the upper contact of relay 225 and, therefore, with the valve closed the raising of armature 226 energizes solenoid 230 and thus completes a circuit to operate motor 234 in the proper direction to open the valve. The movement of the valve to the fully open position swings armatures 238 and 239 to the left so that the circuit through solenoid 230 is broken, but armature 239 moves into engagement with a left-hand contact so as to connect the negative line to solenoid 229. At this time, however, armature 226 of relay 225 is latched in its raised position by a latching mechanism which has a releasing solenoid 231, but when this solenoid is energized as outlined below armature 226 drops so as to connect the positive line through line 227 to solenoid 229. This operates the relay so as to start motor 234 in such a direction as to close the hopper valve and when the valve is completely closed, armatures 238 and 239 swing back to the position shown so as to break the circuit to solenoid 229 and stop motor 234.

When armature 238 is in its left-hand position (that is, when the valve is open) it connects the negative line through a line 242, a scale overload switch 244 and a line 246 to solenoid 222 and a solenoid 249. When solenoid 222 is energized it raises armature 248 which is connected to the negative line and thereby completes a circuit through a line 250 to a vibrator unit 252 which is connected to the positive line and is positioned on the side of the hopper at the bottom of bin 40. Line 246 is also connected to solenoid 254 of the high-speed feed relay 255, the energization of which operates the high-speed feed motor 256 so as to feed flour from bin 40 into the scale hopper at high speed. The other side of solenoid 254 is connected to line 220 so that when the bin valve is opened so as to energize line 246, and the flour feed control circuit including line 220 is also energized, flour is fed by the operation of the high-speed feed motor 256. Line 246 is also connected to one side of the solenoid 249 of a low-speed feed relay 257, the energization of which completes circuits to operate a low-speed feed motor 259. The other side of solenoid 249 is connected through a line 261 to the lower contact of armature 218 of relay 92.

Therefore, as will be explained below, the feeding operation from bin 40 is initiated by connecting the positive line through the flour feed control circuit outined above to line 220, and this initially energizes solenoid 224 of relay 225 so as to open the valve at the bottom of bin 40. When this valve is completely open armature 238 swings to the left with the result that the negative line is connected to solenoids 222, 254 and 249. At this time line 220 is still connected to the positive line so that the movement of armature 238 to the left energizes solenoids 222 and 254. The energizing of solenoid 222 starts the operation of the vibrator unit 252 and the energization of solenoid 254 starts the high-speed flour feed motor 256. As explained above, as the amount of flour in the hopper approaches final weight, the rate of feed of flour to the hopper is reduced. This reduction is brought about by dropping armature 218 of relay 92 so as to deenergize line 220 and energize line 261.

Thus, the high-speed flour feed relay 255 is deenergized and the high-speed motor is stopped and the low-speed flour feed relay 257 is energized and the low-speed feed is started. At this time solenoid 222 is deenergized so as to stop the vibrator unit. The low-speed feeding operation continues until full weight is reached.

The selection of clear flour by the operator is made by closing push button 138 and this initiates the delivery of clear flour from bin 42 by energizing the clear flour feeding mechanism 80. The structure and operation of mechanism 80 is similar to that of mechanism 82 and the corresponding parts have been given corresponding numbers with the suffix —2. Likewise, relays 86 and 90 operate in a manner similar to relays 84 and 92 and the corresponding parts of relays 86 and 90 have also been identified by the suffix —2.

Either before or after the selection of the type of flour, the operator also selects the collector to which the batch of flour is to be delivered. Therefore, assume that the operator closes collector selecting switch 114 so as to select collector 61. Switch 114 is connected at the left through a line 258 and armature 260 of the collector protector switch 112 to the positive line and the closing of switch 114 completes a circuit to one side of solenoid 262 of the collector setting relay. The other side of this solenoid is connected through a line 264 and an armature 266 of valve protecting relay 118 to the negative line; and, therefore, the closing of the collector selecting switch energizes relay 116 and the armatures are latched in their raised position by a latch assembly 268 having a latch-releasing solenoid 270.

Relay 116 has three armatures 272, 274 and 276. Armature 272 forms with its lower contact a switch 277 and at each of the collector stations there is a similar switch. These switches are connected in series by lines 280 . . . 280—5 between a line 278 and a line 282. Line 278 is connected to the latch-releasing solenoid 372 of collector protective relay 112, and also to one switch unit of each of the reset switches 252, the functions of which will be explained below; and line 282 is connected to the latch-releasing solenoid 283 of air feed relay 94 and also to the contact of the switch 285 of blowout relay 102 for purposes to be discussed below.

As discussed above, each of the collectors has a hopper into which the various quantities of flour are deposited and in which they may be temporarily stored. At the bottom of each hopper is a valve 71 which is normally open, but which is closed during the delivery of the flour to that hopper, and which remains closed until the operator discharges the flour. The valve is opened to discharge the flour and it remains open until that particular collector is selected to receive another quantity of flour. The position of each valve 71 is used to indicate whether or not its particular collector contains flour. For example, referring to Figure 1, the positions of the various valves 71 indicate that collectors 62 to 64 have received flour which has not been discharged from their respective hoppers; whereas, collectors 61, 65 and 66 have been discharged after having last received flour.

The conditioning of a collector station to receive flour therefore involves first the closing of its hopper valve 71 and this is done in a manner discussed more fully below at the time relay 116 is first energized. The closing of valve 71 swings the armatures of switch 295 to the right-hand position with the result that armature 294 connects line 292 to the positive line. Line 292 is connected to solenoid 290 of relay 120, and when armature 274 of relay 116 is in its raised position, it engages a contact 286 which is connected through a line 288 to solenoid 290 which is thereby energized to set up the circuits for the valve operating mechanism for the valve 68 at collector 61. The energization of solenoid 290 of relay 120 raises armatures 289, 291 and 293 and they are held raised by a latch 297 which has a latch-releasing solenoid 299. When all of the collectors have been out of use, so that all of collector relays 120 are deenergized, line 284 is connected to the negative line through a series circuit formed by a switch 296 of relay 120—6 of collector 66, and a line 300 and a switch 302 of the valve operating mechanism 122 for each of the collectors 61 to 65. However, the valve operating mechanism for each of the valves 68 operates in the same manner as does the valve operating mechanism 232 described above and each of switches 302 is opened when its associated valve is opened to divert flour into its collector. Therefore, solenoid 290 of relay 120 is energized only when the discharge valve at the bottom of the collector is closed and all of valves 68 are closed, and the valve 68 at collector 61 can only be opened by the energization of relay 120 because this relay controls the valve operating mechanism.

This valve operating mechanism is the same as the mechanism 232, described above, which operates the valve at the bottom of bin 40, and includes a valve operating motor 304 which operates the valve and simultaneously swings the armatures of a limit switch 301 between the right-hand position shown, wherein the left-hand armature 303 sets up a circuit to energize a valve-opening solenoid 305 when armature 393 is raised, and a left-hand position, wherein the right-hand armature sets up a circuit to energize a valve-closing solenoid 307 when armature 393 is in its lower position. As armature 303 swings to the left at the time the valve is opened, it connects the positive line through a line 309 to solenoid 311 of the valve-protecting relay 118. The other side of solenoid 311 is connected to the negative line so that relay 118 is energized whenever valve 68 for collector 61 is opened to divert flour into this collector.

Armature 276 of relay 116 is connected to line 282 and when in the raised position it engages a contact connecting it through a line 306 to the contact of an armature 308 of the valve protecting relay 118. Armature 308 is connected through a line 310 to the solenoid 312 of the collector protective relay 112, the other side of which is connected to the negative line. Line 282 is connected to the contact of switch 285 of the blowout relay, the armature of which, is connected to the positive line; and, at this time, the solenoid 315 of the blowout relay is energized due to being connected to the positive line through line 393 and armature 317 of the scale discharge relay 104. Therefore, line 282 is connected to the positive line, and the raising of armature 276 completes a circuit through a line 306, armature 308 and line 310 to energize solenoid 312 of the collector protective switch 112. This raises the armatures of this relay so that line 258 is disconnected from the positive line and, therefore, switches 114 are rendered ineffective.

As pointed out above, the raising of armature 274 sets up the circuit for energizing solenoid 290 of relay 120 so that its armatures 289, 291 and 293 are raised. Armature 291 of relay 120 is connected to the positive line and the raising of this armature connects the positive line to a loading indicating light 319 on control panel 124 which is for the purpose of indicating to the operator that the circuits are then set for loading the collector. The other side of this loading indicating light is connected through line 321 to armature 266 of relay 118 through its upper contact with the armature being connected to the negative line; this armature is then being held in the raised position. The raising of armature 266 deenergizes solenoid 262 of relay 116, but the armatures of relay 116 are held raised by the latch 268.

With the scale set for the desired weight and with the circuit set up so that the system is prepared to deliver patent flour to the scale hopper and from the scale hopper to collector 61, the weigh switch 146 is closed. This connects the positive line through the zero scale switch 178, line 184, armature 162, contact 168, line 188 and the weigh switch 146 to a weighing line 330. Line 330 is connected to an armature 332 of collector protective relay 112 and with this relay energized, a circuit is set up through this armature and line 334 to one side of solenoid 336 of scale control relay 106. The other side of this solenoid is connected to the negative line so that the solenoid is thereby energized with the result that its armatures 338, 340 and 342 are raised. When armature 340 is raised, it engages contact 214 so as to connect the flour feed control circuit referred to above through a line 344 to a contact which is engaged by an armature 346 of relay 96. Armature 346 is connected to the positive line so that the flour feed control circuit is completed through the following: armature 346, line 344, armature 340, contact 214, line 212, armature 196, line 210, armature 208, line 216, armature 218 and line 220 to solenoids 222, 224 and 254. As outlined above, this initiates the feeding operation and flour is fed to the scale hopper at a rapid rate.

When the initial quantity of flour flows into the hopper, switch 178 opens with the result that line 184 is disconnected from the positive line. This opens the circuit from the positive line to the solenoids of relays 92 and 88 with the result that the armatures of these relays will drop at any time that their armature latches are released. When the scale hopper approaches the final weight position for which the scale is set, switch 174 closes and this connects the positive line through a line 348 to the latch-releasing solenoid 350 of the patent flour control relay 92. Therefore, the armatures of this relay fall so as to disconnect the flour control feed circuit from line 220 and to connect it to line 261. As pointed out above, this stops the high speed feed motor 256 and starts the low speed feed motor 259. When the final weight is reached, switch 176 closes thereby connecting the positive line 352 to the solenoid 353 of the scale discharge holding relay 108. Solenoid 353 is connected at its other side to the negative line so that the solenoid is energized and armatures 356, 358 and 360 are moved through a cycle. Armatures 356 and 358 and the contact of armature 360 are connected to the positive line, and armature 360 is connected through a line 362 to the latch-releasing solenoid 354 of the scale control relay 106.

It will be noted that solenoid 336 of scale control relay 106 is normally energized only momentarily by the closing of weigh switch 146 and, therefore, at this time the armatures of relay 106 are held in the raised position by the latch. Latch-releasing solenoid 354 of this relay is connected at one side to the negative line and, therefore, the raising of armature 360 of relay 108 energizes solenoid 354, thereby releasing the latch and permitting the armatures of relay 106 to drop. This opens the above-outlined flour feed control circuit because armature 340 moves away from contact 214 with the result that solenoid 249 is deenergized and the feeding operation is stopped immediately.

Line 362 is also connected to the latch-releasing solenoid 231 of relay 225 and the other side of this solenoid is connected to the negative line. Therefore, the raising of armature 360 also releases the latch of relay 225 and permits armature 226 to drop; and, the bin valve then being open and armature 239 being in the left-hand position, the valve-closing solenoid 229 of the valve operating mechanism 232 is energized. This operates motor 234 to close the valve. In this way the weighing operation is completed in a minimum length of time and immediately upon the scale reaching the desired final weight the feeding operation is stopped. If for any reason the feeding operation should not be stopped at the proper time, the scale will not be overloaded because the scale overload switch 224 will open at such time as the scale has received a predetermined maximum amount of flour. This breaks the circuit to solenoids 222, 254, and 249 so as to stop all feeding operations until the overload condition has been relieved. The lifting of armature 358 of the scale discharge holding relay connects the positive line to the scale printing mechanism 110 so as to print automatically the weight and the type of flour which has been weighed out.

If during the weighing operation the operator wishes to stop the feeding of flour to the scale hopper, he closes his "stop" switch 142 and this connects the positive line from armature 164, through line 182, stop switch 142 and a line 364 to latch-releasing solenoid 354 of the scale control relay 106, and also to latch-releasing solenoid 231 of relay 225. This stops the feeding operation in the same manner as does the raising of armature 360 of relay 108. The operator may then restart the feeding of flour to the scale hopper by closing his auxiliary weigh switch 148. This completes a circuit from line 182 through switch 148 to line 330 which is the line energized initially for starting the weighing operation. Therefore, if the system is in condition to make the weighing out of flour desirable, the weighing operation is restarted and carried to conclusion in the same manner as if it had never been stopped. Under some circumstances it is desirable to prevent the restarting of the weighing operation after it has once been stopped and, therefore, switch 150 is opened so that the auxiliary weigh switch is rendered ineffective.

It has been pointed out above that the normal operation is to select the type of flour, the weight and the destination of the batch of flour prior to starting the weighing operation. However, if the operator wishes to change this selection once it has been made, he pushes his collector reset push button switch 152 thereby closing the switch units 365 and 367. These switch units are connected at one side to line 182 which, as pointed out above, is connected to the positive line through the switch 180. Therefore, the closing of switch unit 365 connects the positive line through a line 366, armature 342 of the scale control relay 106 and a line 368 to armatures 289 of the collector relays 120. Whenever a collector has been selected, its relay 120 is energized so that the armature 289 of the selected collector engages its contact. These contacts are connected through lines 370 to their respective latch-releasing relays 270 of the collector setting relays 116. Therefore, the closing of switch unit 365 releases any collector setting relay which is then energized so that the operator can make a new selection of the collector to which the batch of flour is to be delivered. The closing of switch unit 367 when line 182 is energized connects the positive line through this switch unit and line 278 to the latch-releasing solenoid 372 of collector protective relay 112; the other side of solenoid 372 is connected to the negative line so that this closing of the reset switch 367 releases the armatures of the collector protective relay. Therefore, after a collector has been selected, the operator may cancel the selection and clear the circuits and he may then select another collector.

As pointed out above, the closing of the scale hopper switch 176 when the final weight has been reached causes the scale discharge holding relay 108 to be energized; the cycle for this relay which is then carried on is as follows: Armature 360 is raised immediately, and, after three seconds, armature 358 is raised and is held raised for two seconds after which it is dropped, and, at that time armature 356 is raised. The raising of armature 360 connects the positive line to line 362, so that the feeding operation is stopped as explained above, and also so as to energize the latch-releasing solenoid 354 of relay 106 and drop the armatures 338, 340 and 342 of this relay. The dropping of armature 340 from its contact 214 opens the feed circuit (outlined above), and the dropping of armature 342 sets up the reset circuit (discussed above) from the reset switch unit 365 through line 366, armature 342 and line 368 to the various collector release armatures 289.

The raising of armature 358 of relay 108 completes a circuit from the positive line to the scale printing mechanism 110 so as to print the final weight of the quantity of flour in the scale hopper. In addition to the weight, a record is made of the type of flour weighed out. For this purpose, lines 204 and 205, which extend to indicating lights 141 and 139 on panels 131 and 131—2, are connected to relays (not shown) in the printing mechanism. Thus, at the time that the respective indicating lights 139 or 141 are lighted to indicate the type of flour selected, the corresponding relay in the printing mechanism is tripped so as to print an indication of the type of flour then being weighed out. Thus, for example, when the patent flour is selected and weighed out, the printing mechanism is conditioned to print an indication that a particular quantity of patent flour was weighed out, and the raising of armature 358 causes the printing operation to be completed.

It has been pointed out that immediately upon the energization of relay 108, the latch-releasing solenoid 354 of relay 106 is energized so as to release the armatures of this relay, and then five seconds later, armature 356 is raised. The raising of armature 356 connects the positive line through this armature and a line 374 to armature 338 which in turn is connected through a line 376 to the latch releasing solenoid 378 of the scale discharge control relay 104. Solenoid 380 of relay 104 is connected at one side to the negative line and at the other side to line 184 so that this relay is energized and its armatures 317 and 382 are lifted when each weighing cycle is started because the zero scale switch 178 is then closed. However, at the end of the weighing operation, which is the portion of the cycle that we are now discussing, switch 178 is open and solenoid 380 of relay 104 is deenergized. Thus, the raising of armature 356, and the resulting energization of solenoid 378 causes armatures 317 and 382 of relay 104 to drop.

The dropping of armature 317 connects the positive line through this armature and a line 375 to the solenoid 377 of the air feed relay 94 so as to raise armatures 379 and 381 of this relay. The raising of armature 379 connects the positive line through a line 383 to the solenoid 385 of the valve motor relay 96 so as to raise its armatures 346 and 387. The raising of armature 346 disconnects line 344 from the positive line so as to open the feed circuit outlined above. The raising of armature 387 operates the motor control mechanism so as to start motor 97 which rotates valve 52 and delivers flour from the bottom of the scale hopper into the stream of air in the aerator 56. The raising of armature 381 of the air feed relay 94 connects the positive line through a line 389 to the solenoid 391 of the hopper discharge relay 98 so as to open the hopper discharge valve 54 and so as to start the hopper vibrator 100. Thus, the flour is delivered from the scale hopper to the air stream in conduit 58 at a controlled rate and the flour is carried by the stream of air to collector 61.

The dropping of armature 382 of relay 104 connects the positive line to line 368, the energization of which, as pointed out above, releases any collector setting relay which is then energized. It was assumed above that the quantity of flour being weighed out was to be delivered to collector 61 and, therefore, it is now assumed that this collector is conditioned for use and the armatures of its relay 116 are raised. Thus, the dropping of armature 382 completes a circuit from the positive line through line 368, armature 289 and line 370 to the latch-releasing solenoid 270, with the result that the armatures of relay 116 are dropped. However, the collector remains in condition to receive flour and the dropping of these armatures merely conditions the circuits for later operations which are discussed below.

When relay 120 is energized, as outlined above, the raising of armature 293 results in the energization of the valve-opening solenoid 305 so that the vane of the valve 68 for collector 61 is swung to divert flour to the collector, and switch unit 302 is opened. The raising of armature 291 of relay 120 energizes the "Loading" signal light 319, and disconnects the positive line from a line 384 which is connected to one side of each of two push button control switches 386 positioned respectively on the control panels 124 and 126 and the adjacent "Full" signal lights 390. The other side of signal light 319 is connected through a line 321 to the upper contact of armature 266 of relay 118 which is at that time being held in raised position by the relay latch mechanism. Therefore, signal light 319 is lighted and it indicates to the operator at the control station that collector 61 is receiving flour.

When all of the flour has been discharged from the scale hopper, the scale returns to its zero weight position so that switches 174 and 176 are reopened and so that switch 178 is reclosed and line 184 is again connected to the positive line. This reenergizes solenoid 380 of relay 104 with the result that armatures 317 and 382 are lifted. The lifting of armature 382 opens the collector release circuit of line 368, etc. and this conditions this circuit for subsequent operations. The lifting of armature 317 deenergizes air feed relay 94 but its armatures are held in raised position by the latch mechanism, and, therefore, the feeding operation continues. However, the raising of armature 317 of relay 104 also connects the positive line through a line 393 to solenoid 315 of the blowout relay 102. Blowout relay 102 has delayed action so that its switch unit remains open for fifteen seconds after its solenoid is energized and at that time the switch unit 285 closes and this connects line 282 to the positive line so as to energize solenoid 283 of the air feed relay 94 thus to drop armatures 379 and 381 and stop the feed motor 97 and vibrator 100 and reclose valve 54.

Therefore, when the scale hopper is emptied and reaches the zero weight, relay 104 is energized immediately but the feeding operation from the bottom of the scale hopper is continued for fifteen seconds to insure that all of the flour is delivered to the air stream in conduit 58, and, also to insure that all of this flour is delivered to the collector at the dough-mixing station. After this fifteen seconds delay, armatures 379 and 381 drop so as to deenergize relay 98 thereby stopping vibrator 100 and reclosing valve 54, and, also deenergizing relay 96. The deenergizing of relay 96 stops motor 97 and also connects the positive line through armature 346 to line 344 thus to condition this circuit for the starting of another feeding operation.

As pointed out above, the deenergizing of relay 104 releases the armatures of the collector setting relay 116 so that the circuits are in their out-of-use condition. Thus, armature 274 drops away from its contact so as to deenergize solenoid 290 of relay 120, and armature 276 drops away from its upper contact so as to break the circuit to solenoid 312 of relay 112. However, both of relays 120 and 112 have their armatures held in raised position by latch mechanism and, therefore, these armatures do not drop until the latches are released. The dropping of armature 272 of relay 116 closes switch unit 277 and completes a circuit between lines 278 and 280 and the dropping of armature 276 completes a circuit from line 282 through a line 399 to the latch-releasing solenoid 299 of relay 120. As pointed out above, when all of the switch units 277 are closed, line 280 is connected to line 282, which, in turn, is connected to switch unit 285 of blowout relay 102. Therefore, at the time all of the flour has been delivered to the scale hopper and the blowout relay armature is lifted, a circuit is completed from the positive line through switch unit 285, line 282, armature 276 and line 399 to latch-releasing solenoid 299, so that the armatures 289, 291 and 293 of relay 120 are released. A circuit is also completed through switch unit 285, line 282, switch units 277 and lines 280 and 278 to latch releasing solenoid 372 of the collector protective relay 112 so as to release armatures 260, 332 and 426. The releasing of armature 289 opens the collector releasing circuit, and the releasing of armature 293 energizes the valve closing solenoid 307 so as to close valve 68, and also so as to reclose switch unit 302. As pointed out above, switches 302, line 300 and switch 296 of relay 120—6 connect the negative line to line 284 so that during the conveying of flour to one of the colectors, the closing of one of the other collector relays 116 will have no harmful effect. That is, with line 284 disconnected from the negative line, the collector selecting relay solenoids 290 cannot be energized.

The releasing of armature 291 disconnects the positive line from the "Loading" light 319 and connects the positive line through line 384 to the "Full" lights 390 so that the operator is informed that the conveying operation has been completed. Line 384 is also connected to the flour discharge switches 386, the other side of each of which is connected through a line 394 to one side of solenoid 396 of the collector discharge relay 128, and the other side of this solenoid is connected to line 321. Therefore, when the operator wishes to discharge the flour from the collector hopper, he closes one of the push button switches 386 so as to energize solenoid 396 of relay 128 and raise armature 398 into engagement with its upper contact. This energizes the valve-opening solenoid 400 so as to operate motor 402 and open the hopper valve 71 at the bottom of the collector. After this valve is completely open, the armatures of switch 295 are swung to the left thereby breaking the valve-opening circuit and stopping motor 402. This also sets up a valve-closing circuit for the valve-closing solenoid 404 from the positive line through armature 294 and its left-hand contact and a line 418 to the lower contact of armature 398, all in a manner explained above in connection with the discussion of the valve operating mechanism 232.

The swinging of armature 294 of switch 295 to the left also opens the circuit of solenoid 290 so that relay 120 can not be energized again until the hopper valve 71 is reclosed. As pointed out above, the inlet valve 68 is moved to divert flour to collector 61 by the lifting of armature 293; thus, by preventing the energization of solenoid 290 so that armature 293 cannot be lifted when the outlet valve 71 is open, the flour-laden stream of air cannot be directed into the collector except when its hopper valve 71 is closed.

As pointed out above, when there is flour in the collector hopper, the armatures of relay 118 are held raised and this prevents the selection of this collector to receive another quantity of flour. However, when relay 128 is energized to discharge flour (as outlined above), the raising of armature 406 connects the positive line through this armature and a line 408 to the latch-releasing solenoid 410 of relay 118 so that the armatures of this relay are permitted to drop. This deenergizes line 321 so that the "Full" signal lights 390 are extinguished and switches 386 are rendered ineffective, although armatures 398 and 406 of relay 128 are held raised by the relay latch mechanism until the latch-releasing solenoid 412 is energized. Thus, the valve 71 for this collector is held open after the flour has been discharged from the hopper until this collector is selected to receive another quantity of flour.

When this collector is to be used again, the closing of the collector selecting switch 114 completes a circuit through a line 414, armature 323 of relay 118 which has been released and a line 416 to energize the latch-releasing solenoid 412 of relay 128. This drops armature 398 so that solenoid 410 is deenergized, and, also drops armature 406 so that the valve closing solenoid 404 is energized through a line 418 with the result that the hopper valve is closed. The closing of this valve permits the valve 68 to be opened so as to divert the flour-laden stream of air into the collector as outlined above.

As pointed out above, the delivery of flour to the scale hopper in any weighing and conveying operation is stopped automatically when the amount of flour in the scale hopper reaches the desired quantity. It was assumed above that a predetermined quantity of patent flour was to be delivered to collector 61, but let us now assume that the desired quantity of flour is being weighed out and that part of it is in the scale hopper when the operator finds that he wishes to stop the operation and, therefore, he closes the stop switch 142. As explained above, this stops the feeding operation immediately and the operator has before him on the scale head 136, an indication of the amount of flour in the scale hopper. Let us also assume that the operator then determines, in accordance with the operation schedule, that he wishes to deliver this quantity of this particular flour to a certain collector. He then pushes the appropriate collector selecting switch 114, and thereafter pushes the scale discharge push button switch 144 which has two switch units 420 and 422 which are in parallel. The closing of switch unit 420 completes a circuit from line 182 through a line 424 and an armature 426 of relay 112 to line 352, and, with line 182 energized, this energizes the scale discharge holding relay 108 without it being necessary to close switch 176. Similarly, the closing of switch unit 422 connects line 182 to line 348 so as to energize the latch-releasing solenoids of relays 92 and 90 without it being necessary to close switch 174. Therefore, the closing of switch 144 conditions the system and the weighed quantity of flour is delivered to the selected collector in the same manner as if the weighing operation had proceeded automatically to its normal conclusion.

As pointed out above, the operator may stop the weighing operation by pushing the stop switch 142 and then he may wish to add an additional quantity of flour to the scale hopper by pushing the auxiliary weigh switch 148. The closing of this switch completes a circuit from armature 164 through line 182 to line 330 and the feeding operation is carried on in the same manner as when the weighing operation is initiated by pressing the weigh switch 146.

In the above discussion it has been pointed out that relay 84 is energized by the depressing of one of the patent flour selecting push buttons 140 and the armatures of this relay are held in contact engaging position by a latch mechanism 200. When the weighing and conveying operation is completed and the collector protective relay 112 is released, the dropping of armature 260 connects the positive line to line 258. Line 258 is connected, as outlined above, to the collector selecting push button 114, but, it is also connected to the lower contacts of the upper armatures 430 and 430—2 of relays 92 and 90. Armature 430—2 is connected through line 432 to latch-releasing solenoid 282 of relay 84, and armature 430 is similarly connected through a line 432—2 to solenoid 202—2 of relay 86. Therefore, the dropping of armature 260 of relay 112 energizes either one or both of the latch releasing solenoids 202 or 202—2, depending upon whether one or both of armatures 430 or 430—2 are released.

The upper contacts of armatures 330 and 330—2 are connected directly to the positive line so that when either of these armatures is raised, the corresponding latch-releasing solenoid 202 or 202—2 is energized and its armatures are released. In this way, both of relays 84 and 86 are in released condition at the end of each weighing and conveying operation, and the energization of relay 92 releases relay 86, while the energization of relay 90 releases relay 84.

Relay 88 has its armature lifted for the selection of patent flour and its armature is held raised by a latch mechanism having a latch-releasing solenoid 436. However, the selection of clear flour energizes solenoids 86 and 90 so that line 184, which is then connected to the positive line, is connected through armature 194—2 and a line 438 to solenoid 436 and to the energizing solenoid of relay 90. Therefore, if there has been a previous selection of patent flour, the subsequent selection of clear flour energizes solenoid 436 and releases armature 208 so that the flour feed circuit, as outlined above, is connected through a line 216—2 to relay 90, and thence, to the clear flour feeding mechanism.

Figure 5:
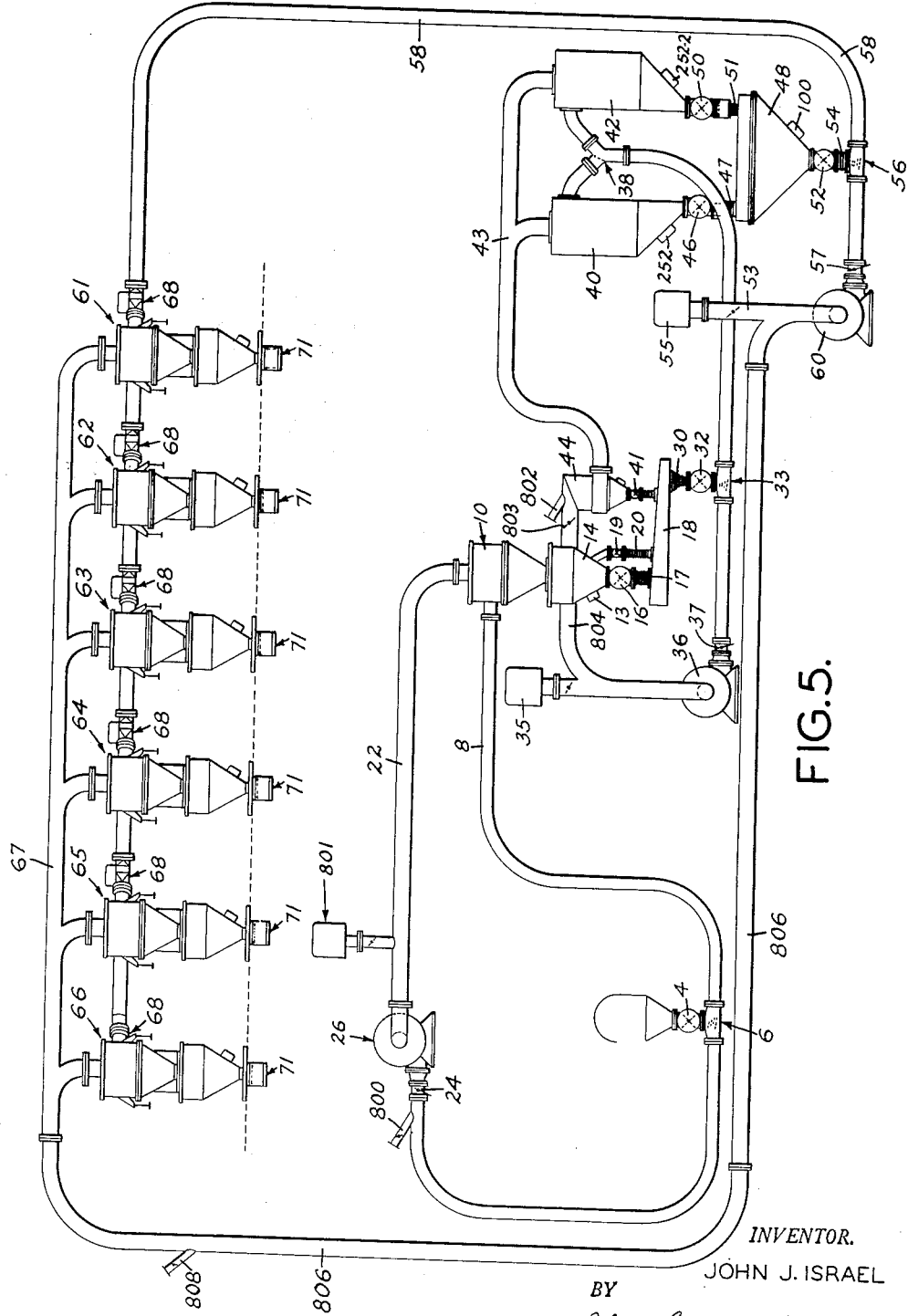

In the embodiment of Figure 5 the arrangement is similar to that of Figure 1 except that the various pneumatic conveyor systems are closed in the sense that the air is recirculated. Very little air is discharged from the systems, and minimum fresh air is drawn in. The various units in Figure 5 are numbered corresponding to those of Figure 1 except where there are differences of structure. Thus, fan 26 discharges through blast gate 24 into conduit 8 rather than to atmosphere and with the blast gate at the outlet of the fan, the pressure in the system is accurately controlled. Fresh air is drawn in through filter 801, and a vent pipe 800, having a damper thereon, is provided to discharge air if the pressure becomes excessive.

The top of collector 44 discharges through a conduit 804 to the inlet of fan 36, with there being a damper 803 to control the pressure and a vent pipe 802 to relieve excess pressure. Fresh air is drawn in through filter unit 35. In a similar manner, conduit 67 is connected through a conduit 806 to the inlet of fan 60 and a vent pipe 808, having a damper thereon, is provided.

The arrangement of Figure 5 is particularly adapted for use where circumstances make the introduction of fresh air undesirable. Furthermore, this system may be used when the product being conveyed is subjected to a treatment during the conveying operation and the treating medium is in the form of a gas; such gases may be introduced in liquid form or from containers replacing the filter units.

Figure 6:
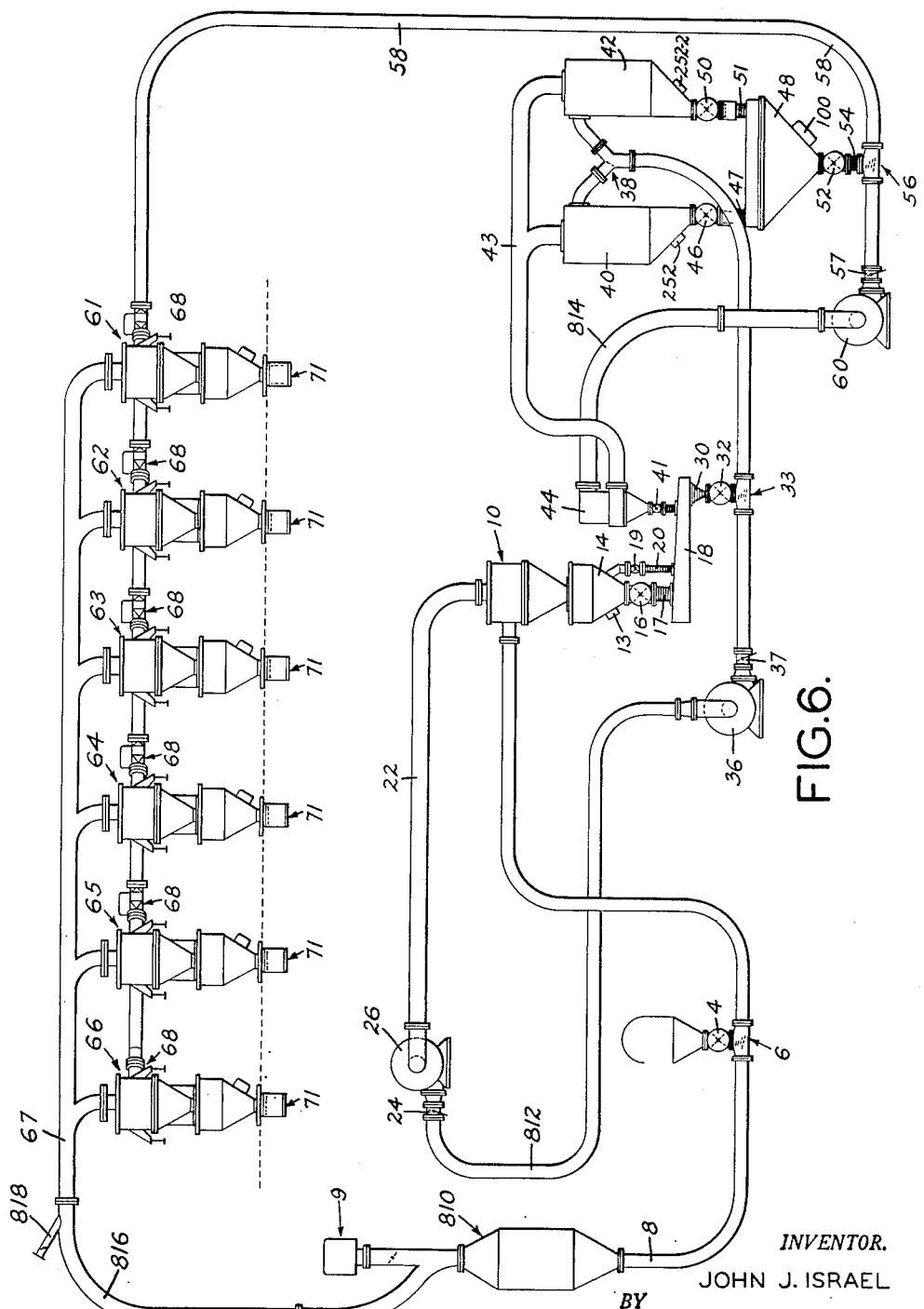

In the embodiment of Figure 6, the three pneumatic circuits are connected in series and at the left an air conditioning unit 810 is provided to impart to the air the desired temperature and humidity conditions. The air from unit 810 passes to conduit 8 and the air from fan 26 passes through a conduit 812 to fan 36. The air from collector 44 passes through a conduit 814 to fan 60, and conduit 67 is connected through a conduit 816 to the air-conditioning unit 810. The system has a vent pipe 818, with a damper thereon. As pointed out above, air-conditioning unit 810 is provided with heating and cooling coils and humidifying means so that the air passing to conduit 8 will be so conditioned that the desired conditioning is imparted to the flour. This type of conditioning unit may be used elsewhere in the system of Figure 6 or in the other systems when desirable.

In the embodiment of Figures 1 and 4a, flour is conveyed from hopper 2 to collector 10 by a suction system, whereas, in Figure 7, a similar system uses pressure at this point in the system. Thus, fan 26 draws in fresh air through a filter 820 and delivers air under pressure controlled by blast gate 24 to conduit 8, and collector 10 discharges directly to atmosphere. With this system it may be desirable to replace aerator 6 with a Venturi type of flour pick-up arrangement. With this arrangement the cross-section of the air stream is reduced at the zone where flour is delivered to the air stream with the result that there is an increase in the rate of air-flow and a decrease in the pressure. Thus, there is no tendency for air to be discharged upwardly through valve 4. This Venturi arrangement may be adopted in all of the embodiments when desirable.

The various pneumatic conveyor systems herein disclosed include arrangements for adjusting the various blast gates to maintain the desired air velocity, either manually or automatically. Normally, the loading of an air stream tends to cause a substantial reduction in the air velocity and, therefore, the blast gates are opened to increase the pressure and maintain somewhat constant air velocity.

In the embodiments of the invention herein disclosed, a single sifter is provided for sifting the flour before it is delivered to the storage and weighing station. Under some circumstances, it may be desirable to provide sifters at the dough-mixing stations, either in place of or in addition to, the sifter here shown. It should also be pointed out that it may be desirable to omit the storage bins and to provide only for temporary storage or for receiving flour from the bags or containers in which it is transported. While the present invention has been disclosed in connection with a flour conveying system, it is important to note that many of the important features are useful in connection with handling other materials.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. In a system for handling bulk products, the combination of, receiving means to receive the incoming product, a plurality of product-receiving units positioned respectively at remote stations, a pneumatic conveying system to carry the product from said receiving means to any one of said remote stations and including a plurality of conduits and means to pass streams of air having the product entrained therein through said conduits and a plurality of product-separating units there being a unit operative to separate the product from the air flowing from each conduit forming a path for the product entrained in a stream of air, sifter means at a sifting station to sift the product after it is received by said receiving means and prior to delivery to any of said product-receiving units, and weighing means including scale hopper means positioned to receive the product after it passes through said sifting means and prior to delivery to any of said product-receiving units.

2. A system as described in claim 1 which includes, automatic control means to control the operation of the system.

3. A system as described in claim 2 which includes, means to control the weighing operation so that predetermined quantities of a selected product may be delivered selectively to the various remote stations, and means to prevent the changing a previous selection of a remote station after the delivery of a particular quantity of the product has been started.

4. A system as described in claim 3 wherein said pneumatic conveying system for the product includes, a metering valve and an aerator, and wherein there is a single scale hopper and a single conduit extends from the scale hopper past said remote stations in series, and valve means at the remote stations to direct the stream of air with the product entrained therein to the selected station.

5. A system as described in claim 3 wherein at least one of said means for separating the product from the air is a collector having primary and secondary stages which are of the cyclone separator type.

6. A system as described in claim 5 wherein each of said pneumatic means and its means for separating the product from the air comprises structures forming passageways and confining the flow so as to maintain a rapid air flow throughout, thereby to prevent the depositing of the product except at the product outlets.

7. A system as described in claim 6 wherein the pneumatic means which receives the product from the receiving means is a suction system and comprises means forming a passageway and a suction device to draw air through said passageway, and a blast gate to control the suction pressure.

8. A system as described in claim 7 which includes, an electrical control system including a plurality of interlocking relays for controlling automatically the weighing of predetermined quantities of the product and the conveying of the quantities to the selected remote stations and means to control said electrical control system adjacent said remote stations.

9. A system as described in claim 8 wherein one of said pneumatic means includes, a fan which draws air into the system through a filter and which exhausts air from the system to atmosphere.

10. A system as described in claim 9, which includes sealing means at each of the outlets for the product from one of said primary and secondary stages whereby each of said stages is sealed during the collecting operation.

11. In a system for measuring and conveying selected quantities of bulk products from any one of a number of product storage bins to any one of a number of remote stations, the combination of, means to select the particular quantity of a product to be measured out and conveyed, means to measure out said particular quantity and to carry the product along a path which extends adjacent the various remote stations, means to select a particular station to which the selected quantity is to be delivered and to divert the product moving along said path to said particular station, relay means which is operated by the measuring out of the first of each quantity of the product thereby to prevent the selecting of another product until a pre-determined cycle of operations has been completed, and means to indicate to the operator the condition of the system and the progress of the measuring and conveying operations.

12. A system as described in claim 11 which includes, relay means to prevent the selecting of another remote station after the starting of the delivery of a selected quantity of the product to a previously selected station.

13. A system as described in claim 12 which includes, a plurality of collectors positioned respectively at the various remote stations, valve means to divert the product to selected collectors, and control means including a plurality of relays which are operated in accordance with a predetermined sequence to control the collecting of the product and the discharging of the product at said remote stations.

14. In a system for handling flour or the like, the combination of, hopper means to receive the incoming flour, pneumatic means to carry the product from said hopper means entrained in a stream of air to a sifting station, collector means to separate the flour from air at said sifting station, sifter means at said sifting station to sift the flour, a plurality of storage bins, pneumatic means to receive the flour from said sifter means and to carry it entrained in a stream of air to a selected storage bin, weighing means adjacent said bins including a scale hopper and means to weigh the flour therein, feed means to deliver flour from a selected bin to said scale hopper, and penumatic means to receive weighed quantities of flour from said scale hopper and to carry the flour entrained in a stream of air to any one of a plurality of remote stations.

15. In a system for handling bulk products, the combination of, receiving means to receive the incoming product, sifting means to sift the product, means to deliver the product from the sifter means to a weighing station, means to weigh the product including a scale hopper, a plurality of storage bins at said weighing station, means to control selectively the delivery of products from the various bins to said scale hopper, and penumatic means to receive the weighed quantities of the product from the scale hopper and to carry the product entrained in a stream of air to a selected destination.

16. A system as described in claim 15 which includes, control means to control the selecting and weighing operations, and means for voiding previous selections prior to the starting of any selected operation.

17. In a system for handling bulk products, the combination of, means constituting sources of different types of bulk material, selecting means to select and measure out a predetermined quantity of a particular type of material, means to deliver said quantity selectively to remote destinations, reset means to reset the selecting means after a selection, and means to prevent the operation of said reset means for the selecting of a different type of material after the delivery of one type has been started and prior to the completing of that particular operation.

18. In a flour conveying system, the combination of, means constituting a plurality of storage spaces where flour of different types may be stored, flour selecting means to select flour from a particular storage space, quantity selecting means to select a quantity of flour to be delivered by a predetermined operation, and cancelling means to cancel a selection of the space from which flour is to be delivered said cancelling means being inoperative during the delivery of flour.

19. In a flour conveying system, the combination of, a plurality of control stations each of which includes control means by which an operator may select a particular quantity of flour from a particular space and control the delivery thereof to a selected destination, a protective relay which is energized by the selection of a particular destination for flour to be delivered and which normally prevents the subsequent selection of another destination during the delivery of a quantity of flour, and reset means to release said protective relay at any time prior to the starting of the flour delivery operation.

20. A flour conveying system as described in claim 19 which includes, a single penumatic conveyor which carries the flour serially past a plurality of destinations, valve means at one of said destinations to divert the flour, and a sequential relay system to control the operation of said valve means and to require the removal of each quantity of flour after arrival at the destination prior to the delivery of another quantity thereto.

21. A system as described in claim 20 which includes, a blowout relay to supervise the continuing of the delivery operation for a period of time after the normal completion thereof to insure the arrival of all of the flour at the selected destination.

22. A flour conveying system as described in claim 21 which includes, weighing means to weigh the various quantities of flour, relay means to stop the weighing operation, auxiliary relay means to restart the weighing operation, and reset relay means to cancel previous selections said reset means being inoperative during the carrying on of the particular selected operation.

23. In a system for selecting and weighing out predetermined quantities of specific types of bulk materials, the combination of, electric relay means to control the selections of the type and quantity of the material, relay means to control the weighing and conveying operations, relay means to cancel a selection of material prior to the starting of the weighing operation, and means to change the selection as to the quantity of the material being weighed.

24. In apparatus for handling bulk materials, the combination of, means to select a particular quantity of a particular type of material, means to select a destination for the particular quantity of material, a pneumatic conveying system which is adapted to convey the material to the selected destination, means to measure out and deliver to said conveying system said particular quantity, and means to change the selection of the type of material except during the delivery thereof and to change the destination of the material except during the arrival of a particular quantity thereto, said apparatus including means to automatically control the operation.

25. Apparatus as described in claim 24 wherein said means to control comprises an electric system which includes a control station and relay means to carry the various functions to conclusion as specified in accordance with control manipulations at said control station.

26. Apparatus as described in claim 25 wherein the material may be conveyed to any one of a plurality of receiving stations, and wherein each receiving station has a relay assembly which controls the delivery of material to its station, and interlock means which locks out the corresponding relay assemblies for the other receiving stations.

27. Apparatus as described in claim 24 wherein the means to measure out and deliver material to said conveying system includes multiple speed material feeding means, and relay means responsive to the quantity of material being fed approaching said particular quantity to reduce the rate of delivery.

28. In apparatus for handling bulk materials, the combination of, control means including a plurality of relays to select a particular quantity of a particular type of material, control means to select a destination for the particular quantity of material, pneumatic conveying means which is adapted to convey the material to the selected destination, means to measure out and deliver to said conveying means said particular quantity of material including feed means having a plurality of rates of feed, and means to change the selection of the type of material except during the delivery thereof and to change the destination of the material except during the arrival of a particular quantity thereto, said apparatus including control means to automatically control the operation and having a separate relay assembly for each type of material, each of which relay assemblies includes relay means controlling the feeding of its particular material at different rates and relay means which is actuated near the end of each feeding operation to reduce the rate of feed.

JOHN J. ISRAEL.

REFERENCES CITED

The following references are of record in the file of this patent:

UNITED STATES PATENTS

| Number | Name | Date |
| --- | --- | --- |
| 182,226 | Randolph | Sept. 12, 1876 |
| 1,301,167 | Renkin | Apr. 22, 1919 |
| 2,140,128 | Craggs | Dec. 13, 1938 |
| 2,288,099 | Mason | June 30, 1942 |
| 2,434,435 | Reibel | Jan. 13, 1948 |